(12) United States Patent
Kuehl et al.

(10) Patent No.: US 9,071,907 B2
(45) Date of Patent: Jun. 30, 2015

(54) VACUUM INSULATED STRUCTURE TUBULAR CABINET CONSTRUCTION

(71) Applicant: Whirlpool Corporation, Benton Harbor, MI (US)

(72) Inventors: Steven J. Kuehl, Stevensville, MI (US); Axel Julio Ramm, Saint Joseph, MI (US); Guolian Wu, Saint Joseph, MI (US); James W. Kendall, Mount Prospect, IL (US); Nihat Cur, Saint Joseph, MI (US); Paul B. Allard, Stevensville, MI (US)

(73) Assignee: Whirpool Corporation, Benton Harbor, MI (US)

( * ) Notice: Subject to any disclaimer, the term of this patent is extended or adjusted under 35 U.S.C. 154(b) by 0 days.

(21) Appl. No.: 13/836,143

(22) Filed: Mar. 15, 2013

(65) Prior Publication Data

US 2013/0256318 A1 Oct. 3, 2013

Related U.S. Application Data (60) Provisional application No. 61/618,914, filed on Apr. 2, 2012.

(51) Int. Cl.
*F25B 19/00* (2006.01)
*H04R 3/12* (2006.01)
*F25D 23/02* (2006.01)
(Continued)

(52) U.S. Cl.
CPC ............... *H04R 3/12* (2013.01); *F25D 23/028* (2013.01); *F25D 23/063* (2013.01); *F25B 39/00* (2013.01); *F25D 11/00* (2013.01); *Y10T 29/49879* (2015.01); *Y10T 29/49947* (2015.01); *Y10T 29/49826* (2015.01); *Y10T 29/49002* (2015.01); *Y10T 29/49359* (2015.01);
(Continued)

(58) Field of Classification Search
CPC ..... F25D 23/06; F25D 23/065; F25D 23/062; F25D 23/08; F25D 2201/14; B29C 52/08; B29C 53/0863; B29C 53/36; B21D 7/00
USPC .............. 29/890.035, 890.034, 890.053, 422, 29/428
See application file for complete search history.

(56) References Cited

U.S. PATENT DOCUMENTS

| | | |
|---|---|---|
| 2,108,212 A | 2/1938 | Schellens |
| 2,985,075 A | 5/1961 | Knutsson-Hal |

(Continued)

FOREIGN PATENT DOCUMENTS

| | | |
|---|---|---|
| CA | 1320631 | 7/1993 |
| CA | 2259665 | 1/1998 |

(Continued)

OTHER PUBLICATIONS

European Patent Application No. 14158608.1 filed Mar. 10, 2014, Applicant: Whirlpool Corporation, European Search re: same, mail date: Oct. 14, 2014.

*Primary Examiner* — Christopher Besler (57) ABSTRACT

A refrigerator includes a vacuum insulated cabinet structure having side walls that are formed from a tube that has been folded/deformed into a structure having an "O" shape with vertically enlarged front and rear openings. The interior of the tube may be filled with silica powder or other filler, and a vacuum is formed within the tube. An insulated rear panel may be utilized to close off the rear opening of the vacuum insulated cabinet structure.

19 Claims, 7 Drawing Sheets (51) Int. Cl.
 *F25D 23/06* (2006.01)
 *F25B 39/00* (2006.01)
 *F25D 11/00* (2006.01)
 *B29C 53/00* (2006.01)

(52) U.S. Cl.
 CPC .......... *F25D 23/062* (2013.01); *F25D 23/065* (2013.01); *B29C 53/00* (2013.01); *F25D 2201/14* (2013.01)

(56) References Cited

U.S. PATENT DOCUMENTS

| | | | |
|---|---|---|---|
| 3,137,900 | A | 6/1964 | Carbary |
| 3,635,536 | A * | 1/1972 | Lackey et al. ................. 312/405 |
| 4,660,271 | A | 4/1987 | Lenhardt |
| 4,671,985 | A | 6/1987 | Rodrigues et al. |
| 4,917,841 | A | 4/1990 | Jenkins |
| 5,007,226 | A | 4/1991 | Nelson |
| 5,033,636 | A | 7/1991 | Jenkins |
| 5,082,335 | A | 1/1992 | Cur et al. |
| 5,175,975 | A | 1/1993 | Benson et al. |
| 5,221,136 | A | 6/1993 | Hauck et al. |
| 5,248,196 | A | 9/1993 | Lynn et al. |
| 5,252,408 | A | 10/1993 | Bridges et al. |
| 5,263,773 | A | 11/1993 | Gable et al. |
| 5,359,795 | A | 11/1994 | Mawby et al. |
| 5,512,345 | A | 4/1996 | Tsutsumi et al. |
| 5,632,543 | A | 5/1997 | McGrath et al. |
| 5,640,828 | A * | 6/1997 | Reeves et al. ............. 52/786.13 |
| 5,652,039 | A | 7/1997 | Tremain et al. |
| 5,985,189 | A | 11/1999 | Lynn et al. |
| 6,109,712 | A | 8/2000 | Haworth et al. |
| 6,128,914 | A | 10/2000 | Tamaoki et al. |
| 6,164,030 | A | 12/2000 | Dietrich |
| 6,224,179 | B1 | 5/2001 | Wenning et al. |
| 6,260,377 | B1 | 7/2001 | Tamaoki et al. |
| 6,408,841 | B1 | 6/2002 | Hirath et al. |
| 6,938,968 | B2 * | 9/2005 | Tanimoto et al. ............. 312/406 |
| 7,210,308 | B2 | 5/2007 | Tanimoto et al. |
| 7,296,432 | B2 | 11/2007 | Müller et al. |
| 7,316,125 | B2 | 1/2008 | Uekado et al. |
| 7,641,298 | B2 | 1/2010 | Hirath et al. |
| 7,815,269 | B2 | 10/2010 | Wenning et al. |
| 7,886,559 | B2 | 2/2011 | Hell et al. |
| 7,930,892 | B1 * | 4/2011 | Vonderhaar ..................... 62/100 |
| 8,117,865 | B2 | 2/2012 | Allard et al. |
| 8,353,177 | B2 | 1/2013 | Adamski et al. |
| 2002/0168496 | A1 | 11/2002 | Morimoto et al. |
| 2006/0201189 | A1 | 9/2006 | Adamski et al. |
| 2007/0001563 | A1 | 1/2007 | Park et al. |
| 2007/0099502 | A1 | 5/2007 | Ferinauer et al. |
| 2009/0056367 | A1 | 3/2009 | Neumann |
| 2009/0058244 | A1 | 3/2009 | Cho et al. |
| 2009/0113925 | A1 | 5/2009 | Korkmaz |
| 2009/0179541 | A1 | 7/2009 | Smith et al. |
| 2010/0293984 | A1 | 11/2010 | Adamski et al. |
| 2010/0295435 | A1 | 11/2010 | Kendall et al. |
| 2011/0146335 | A1 | 6/2011 | Jung et al. |
| 2011/0260351 | A1 | 10/2011 | Corradi et al. |
| 2011/0290808 | A1 | 12/2011 | Bai et al. |
| 2011/0315693 | A1 | 12/2011 | Cur et al. |
| 2012/0000234 | A1 | 1/2012 | Adamski et al. |
| 2012/0103006 | A1 | 5/2012 | Jung et al. |
| 2012/0104923 | A1 | 5/2012 | Jung et al. |
| 2012/0118002 | A1 | 5/2012 | Kim et al. |
| 2012/0137501 | A1 | 6/2012 | Allard et al. |
| 2012/0279247 | A1 | 11/2012 | Katu et al. |
| 2012/0297813 | A1 | 11/2012 | Hanley et al. |
| 2012/0324937 | A1 | 12/2012 | Adamski et al. |

FOREIGN PATENT DOCUMENTS

| | | |
|---|---|---|
| CN | 1158509 | 7/2004 |
| CN | 1970185 | 5/2007 |
| CN | 100359272 | 1/2008 |
| CN | 102452522 | 5/2012 |
| DE | 19818890 A1 | 11/1999 |
| DE | 102010024951 | 12/2011 |
| EP | 1200785 | 5/2002 |
| EP | 1505359 | 2/2005 |
| FR | 2980963 A1 | 4/2013 |
| GB | 837929 | 6/1960 |
| GB | 1214548 | 12/1970 |
| JP | 73028353 | 8/1973 |
| JP | 51057777 | 5/1976 |
| JP | 59191588 U | 12/1984 |
| JP | 08300052 | 11/1996 |
| JP | 2000097390 A | 4/2000 |
| JP | 2000117334 | 4/2000 |
| JP | 2001343176 | 12/2001 |
| JP | 03478771 | 12/2003 |
| JP | 2004303695 | 10/2004 |
| JP | 2005164193 | 6/2005 |
| JP | 2007263186 A | 10/2007 |
| JP | 2009162402 | 7/2009 |
| JP | 2010108199 A | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 A | 1/2011 |
| JP | 2011196644 | 10/2011 |
| JP | 2012087993 | 5/2012 |
| JP | 2012163258 A | 8/2012 |
| JP | 2012242075 | 12/2012 |
| JP | 2013050242 A | 3/2013 |
| JP | 2013088036 A | 5/2013 |
| KR | 20040000126 | 1/2004 |
| KR | 20120007241 A | 1/2012 |
| WO | WO2010092627 | 8/2010 |
| WO | WO2011003711 | 1/2011 |
| WO | WO2012026715 | 3/2012 |

* cited by examiner

VACUUM INSULATED STRUCTURE TUBULAR CABINET CONSTRUCTION

CROSS-REFERENCE TO RELATED APPLICATIONS

The present application is related to U.S. patent application Ser. No. 13/833,635 filed Mar. 15, 2013, entitled A METHOD TO CREATE VACUUM INSULATED CABINETS FOR REFRIGERATORS; and U.S. patent application Ser. No. 13/836,669 filed Mar. 15, 2013, entitled FOLDED VACUUM INSULATED STRUCTURE; and U.S. patent application Ser. No. 13/835,449 filed Mar. 15, 2013, entitled A VACUUM PANEL CABINET STRUCTURE FOR A REFRIGERATOR; and U.S. patent application Ser. No. 13/832,246 filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/833,696 filed Mar. 15, 2013, entitled VACUUM INSULATED DOOR STRUCTURE AND METHOD FOR THE CREATION THEREOF; and U.S. patent application Ser. No. 13/836,143 filed Mar. 15, 2015, entitled VACUUM INSULATED STRUCTURE TUBULAR CABINET CONSTRUCTION; and U.S. patent application Ser. No. 13/837,659 filed Mar. 15, 2013, entitled FOLDED VACUUM INSULATED STRUCTURE; and U.S. patent application Ser. No. 13/833,685 filed Mar. 15, 2013, entitled METHOD TO CREATE VACUUM INSULATED CABINETS FOR REFRIGERATORS, all of which are incorporated herein by reference in their entirety.

BACKGROUND OF THE INVENTION

Various types of insulated cabinet structures have been developed for refrigerators, freezers and the like. Known refrigerator cabinet structures may include inner and outer walls with urethane foam or other insulating material disposed between the inner and outer walls.

SUMMARY OF THE INVENTION

One aspect of the present invention is a method of fabricating a vacuum insulated refrigerator housing. The method includes forming an elongated tube having opposite open ends defining a link therebetween. The tube may be formed from a metal material, or the tube may comprise multiple layers of polymer material, wherein one of the layers is substantially impermeable to gasses such as nitrogen, oxygen and water vapor. The elongated tube has a substantially uniform cross-sectional shape along the length of the tube, and the tube defines generally planar first and second oppositely facing primary outer surfaces. The tube further includes first and second end surfaces extending between the first and second primary outer surfaces. The method further includes forming the tube along at least four fold lines to form at least four corners, whereby portions of the first primary surface adjacent each corner are substantially orthogonal relative to one another. The method further includes sealing the opposite ends of the elongated tube to form an air-tight insulating space within the tube. The opposite ends of the tubes are connected to one another to form a refrigerator housing structure that is generally "O" shaped with horizontally spaced apart, generally vertical side walls and vertically spaced apart generally horizontal upper and lower side walls forming four corners. The refrigerator housing structure defines an internal space having enlarged front and rear openings. The method further includes forming a vacuum in the insulating space within the tube, and attaching an insulated rear panel to the refrigerator housing structure to at least partially close off the enlarged rear opening.

Another aspect of the present invention is a method of forming a vacuum insulated refrigerator housing structure. The method includes forming an elongated tube having opposite ends. The opposite ends are sealed to form an air-tight insulating space within the tube. The method further includes forming a vacuum in the air-tight insulating space, and positioning the opposite ends of the tube adjacent to one another by deforming the tube. The opposite ends are connected together to form a refrigerator housing structure that is generally "O" shaped with spaced apart upright side walls, and spaced apart upper and lower side walls extending between the upright side walls. The refrigerator housing structure defines an internal space and enlarged front and rear openings.

Another aspect of the present invention is a vacuum insulated refrigerator housing structure including a pair of horizontally spaced apart upright side walls defining upper and lower end portions. The vacuum insulated refrigerator housing structure also includes an upper side wall having opposite ends connected to the upper end portions of the upright side walls, and a lower side wall having opposite ends connected to the lower end portions of the upright side walls. The upright side walls and the upper and lower side walls comprise a one-piece integral tubular structure forming air-tight insulating space within the upright side walls and the upper and lower side walls. The air-tight insulating space is evacuated and thus forms a vacuum insulated structure.

These and other features, advantages, and objects of the present invention will be further understood and appreciated by those skilled in the art by reference to the following specification, claims, and appended drawings.

DETAILED DESCRIPTION

Figure 1:
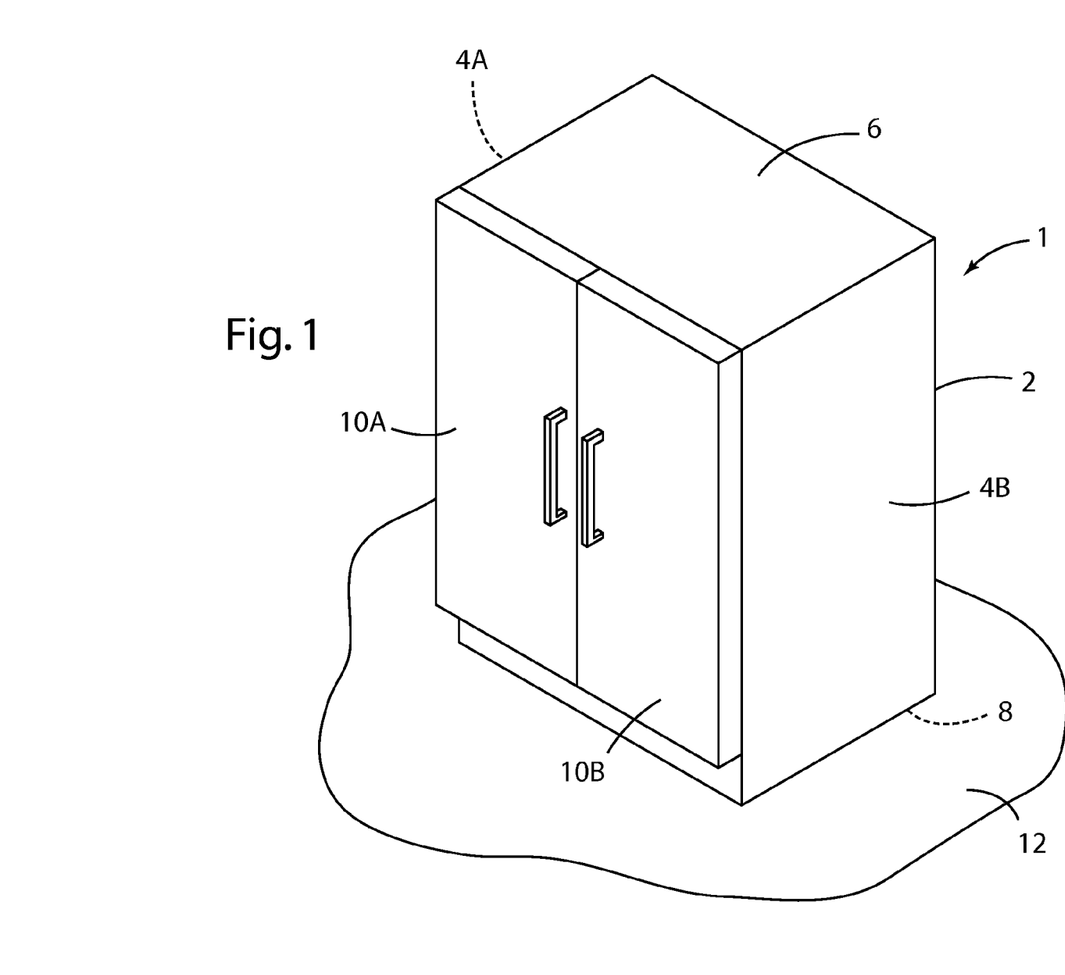
FIG. 1 is an isometric view of a refrigerator having a vacuum insulated tubular cabinet according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a refrigerator 1 includes an insulated cabinet structure 2 including generally upright side walls 4A and 4B, a horizontally extending upper side wall 6, and a generally horizontal lower side wall 8. Doors 10A and 10B are moveably connected to the insulated cabinet structure 2 to provide access to an insulated interior space 14 (see also FIG. 2) of the refrigerator 1. The refrigerator 1 is generally configured to be supported free-standing on a floor surface 12.

Figures 2, 3:
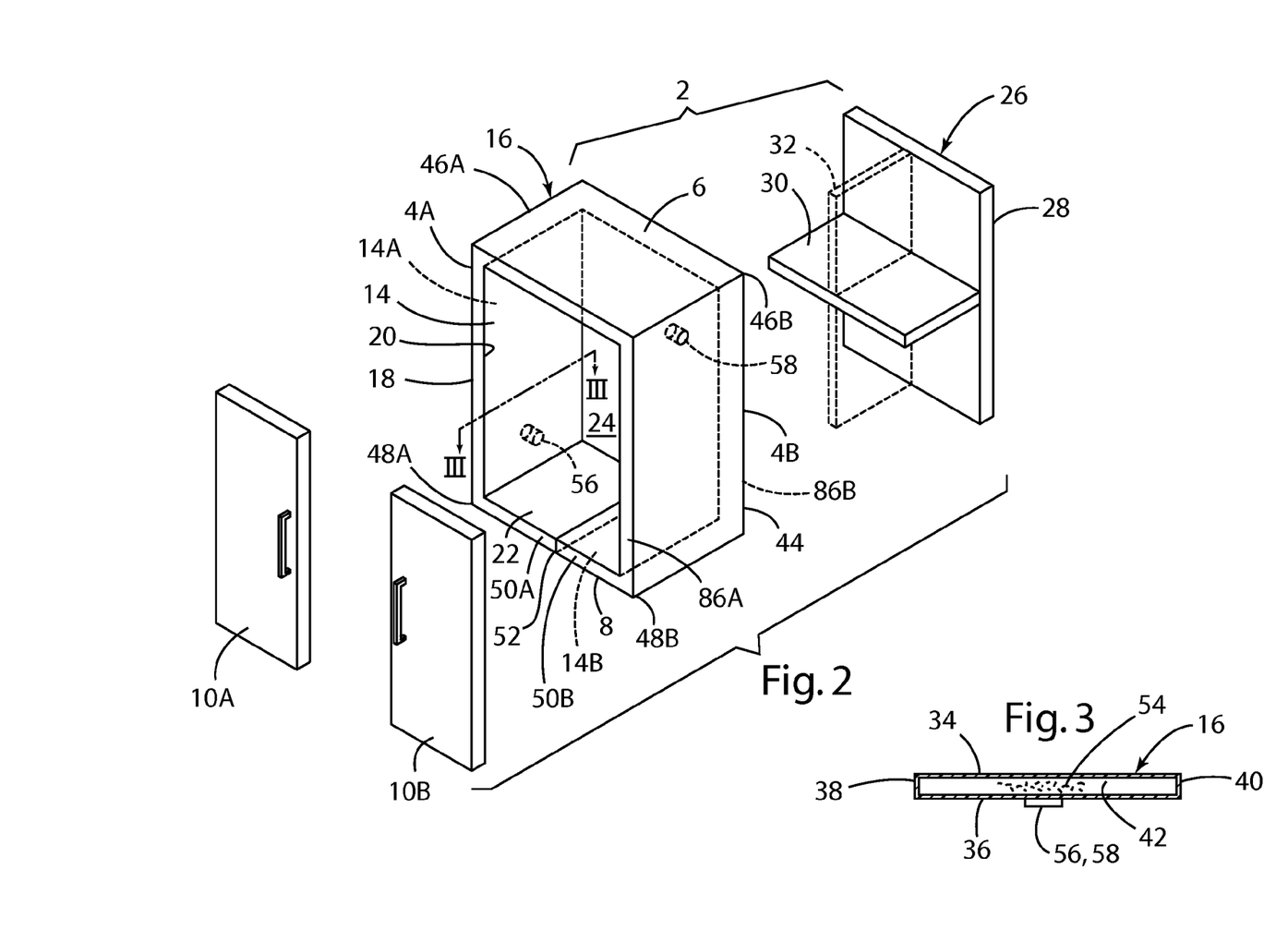
FIG. 2 is an exploded isometric view of the refrigerator of FIG. 1.
FIG. 3 is a cross-sectional view of the refrigerator housing of FIG. 2 taken along the line III-III.

With further reference to FIG. 2, the insulated cabinet structure 2 includes a tubular primary structure 16 forming upright side walls 4A and 4B, upper side wall 6, and lower side wall 8. The tubular primary structure 16 is generally O-shaped, with a rectangular outer perimeter 18, and a rectangular inner perimeter 20. The inner perimeter 20 defines an enlarged rectangular front opening 22 and a rectangular rear opening 24. When assembled, the rear opening 24 is closed off by a rear wall assembly 26. The rear wall assembly 26 includes an upright panel 28, and a mullion cooling system 30. The rear wall assembly 26 may optionally include an insulated vertical panel or divider 32 that divides the insulated interior space 14 into a first space 14A and a second space 14B. The first space 14A may comprise a freezer space, and the space 14B may comprise a fresh food compartment. The mullion cooling system 30 may include an interior volume (not specifically shown in FIG. 2) that is configured to receive mechanical equipment for operating the various functions of the refrigerator 1. For example, a cooling module set can be disposed within the interior volume of the mullion 30. Examples of various cooling modules are disclosed in U.S. patent application Ser. No. 13/108,226 entitled "COOLING SYSTEM INTEGRATION ENABLED PLATFORM ARCHITECTURE" filed on May 15, 2011; U.S. patent application Ser. No. 13/108,293 entitled "FLEXIBLE COOLING SYSTEM INTEGRATION FOR MULTIPLE PLATFORMS" filed on May 16, 2011; and U.S. patent application Ser. No. 13/108,183 entitled "UNIVERSAL AND FLEXIBLE COOLING MODULE SET (CMS) CONFIGURATION AND ARCHITECTURE" filed on May 16, 2011. Each of these applications is hereby incorporated herein by reference in their entirety.

The tubular primary structure 16 is made from an elongated tube 44 (FIG. 5) that includes generally planar side walls 34 and 36 (FIG. 3), and edge or end walls 30 and 40 extending transversely between the inner and outer walls 36. As discussed in more detail below, the tubular primary structure 16 (FIG. 2) is made from a single elongated tube 44 that is deformed to form upper corners 46A and 46B, and lower corners 48A and 48B. Ends 50A and 50B of the tube are interconnected along an air-tight seam 52 that is preferably located in lower side wall 8. The tubular primary structure 16 includes a continuous, sealed insulating space 42 that is preferably filled with a porous filler material 54. The filler material 54 may comprise a silica powder such as fumed silica or other suitable material, and a vacuum may be formed in space 42 utilizing one or more inlet valves 56, and one or more outlet valves 58. Filler material 54 prevents collapse of tube 44 due to the vacuum formed in space 42 and provides superior insulation performance under vacuum.

Figures 4, 5:
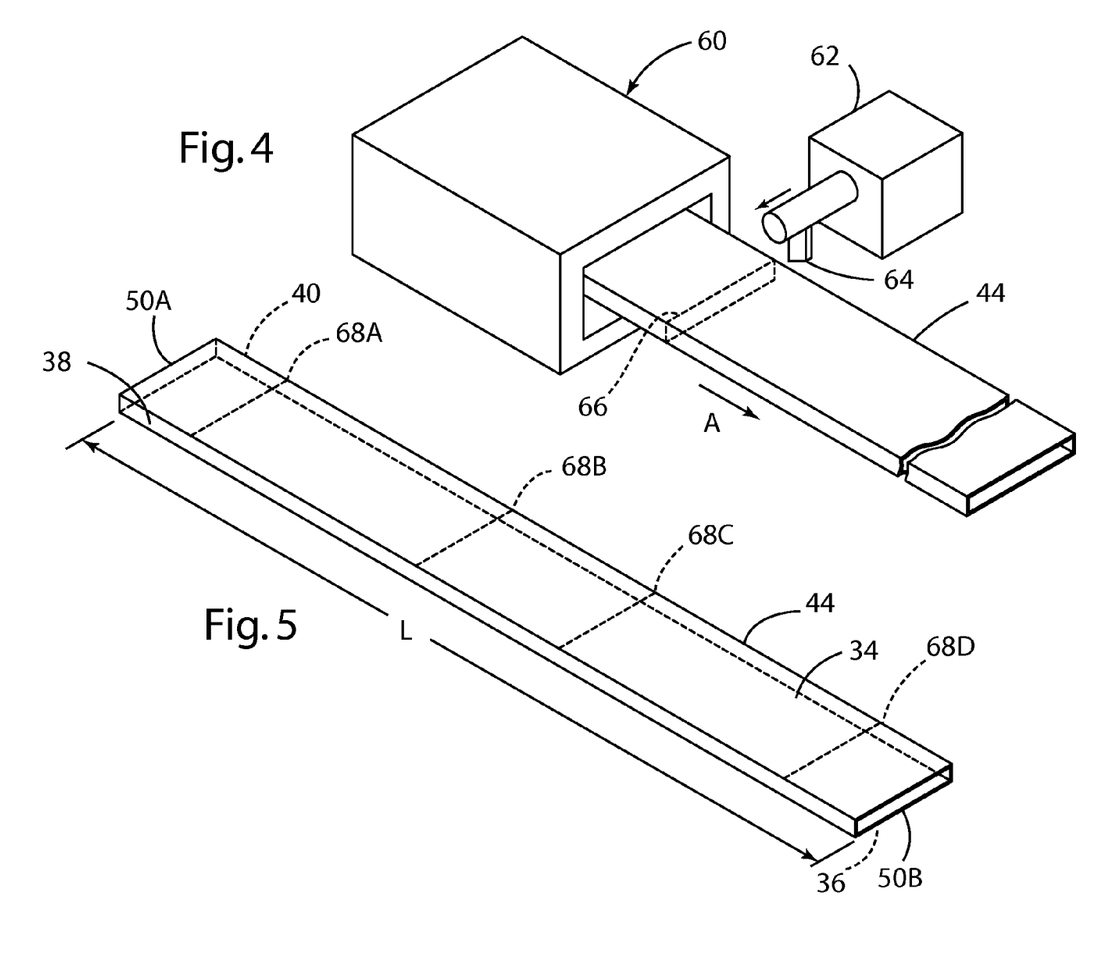
FIG. 4 is a partially schematic isometric view of an extrusion apparatus and process.
FIG. 5 is an isometric view of a tube prior to bending.

With further reference to FIG. 4, tube 44 is initially formed utilizing an extrusion process. An extruding apparatus 60 extrudes the tube 44 in the direction of the arrow "A". The extruding apparatus 60 may comprise a suitable known device. The tube 44 may be formed from a metal material such as low carbon steel, stainless steel, aluminum, or other suitable metal. Alternately, tube 44 may comprise a thermoplastic polymer material such as high impact polystyrene that is co-extruded with a layer of impermeable polymer material such as ethylene vinyl alcohol (EVOH). The EVOH layer is substantially impermeable to oxygen, nitrogen and water vapor to thereby enable formation and maintenance of a vacuum in internal space 42 when the tube 44 is formed into the tubular primary structure 16 (see also FIG. 2).

Figure 6:
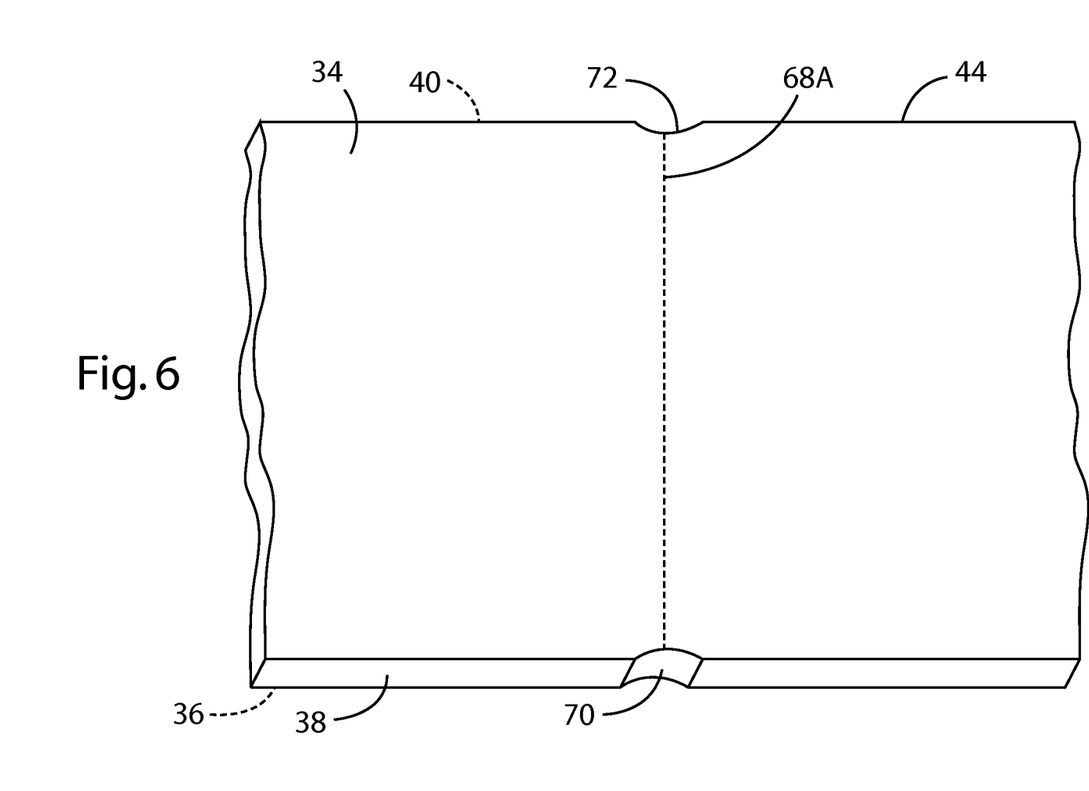
FIG. 6 is a partially fragmentary isometric view of a portion of the tube of FIG. 5.

After a sufficient length of tubing 44 is extruded (FIG. 4), a cutting device or apparatus 62 having a cutter 64 is utilized to cut the elongated tube 44 along a plane 66 to thereby form a tube 44 (FIG. 5) having opposite ends 50A and 50B defining a length "L". As discussed in more detail below, the tube 44 is bent along the fold lines 68A-68D to form corners 46A, 46B, 48A and 48B of the tubular primary structure 16 (FIG. 2). With further reference to FIG. 6, prior to formation of the corners 46A, 46B, 48A and 48B, the side walls 38 and 40 are first deformed inwardly at each fold line 68A-68D to form indentations 70 and 72. If tube 44 comprises a metal material, the indentations 70 and 72 may be formed utilizing dies or other known metal forming tools (not shown). If the tube 44 comprises a polymer material, the indentations 70 and 72 may be formed by first heating the elongated tube 44 to soften the polymer material, and a forming tool (not shown) may be utilized to push in the side walls 38 and 40 to form the indentations 70 and 72.

Figure 7:
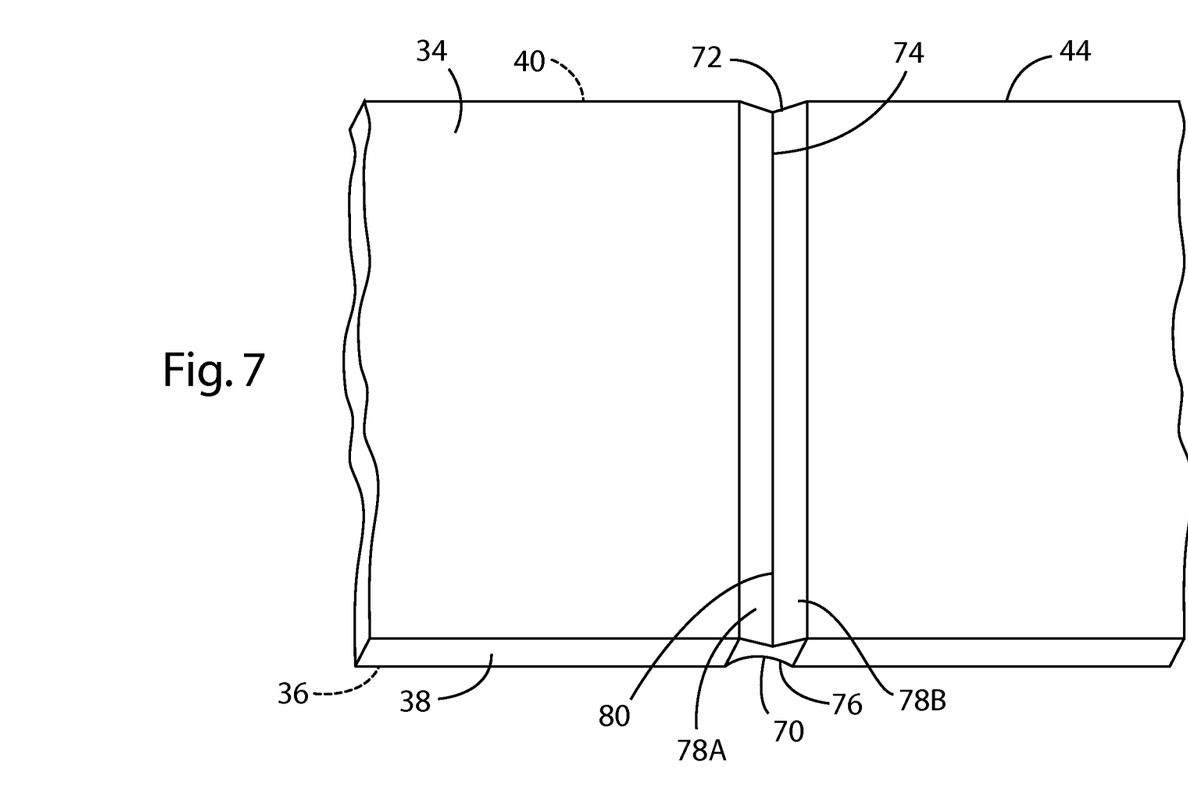
FIG. 7 is a partially fragmentary isometric view of a portion of the tube of FIG. 5.

With further reference to FIG. 7, elongated grooves or indentations 74 and 76 (76 not anticipated but could be employed) may also be formed in one or both of side walls 34 and 36 at each fold line 68A-68D. The grooves 74 and 76 may be formed in addition to the indentations 70 and 72, or the grooves 74 and 76 may be formed in a tube 44 that does not include indentations 70 and 72. The grooves 74 and 76 include angled side walls 78A and 78B that intersect at a line or crease 80. The grooves 74 and/or 76 may be formed by heating the tube 44 if the tube 44 is formed of a polymer material, followed by pressing a forming tool (not shown) into the side wall 34 and/or 36 of tube 44. If tube 44 is made of a metal material, a conventional forming die or the like (not shown) may be utilized to form the grooves 74 and 76.

Figures 8, 9:
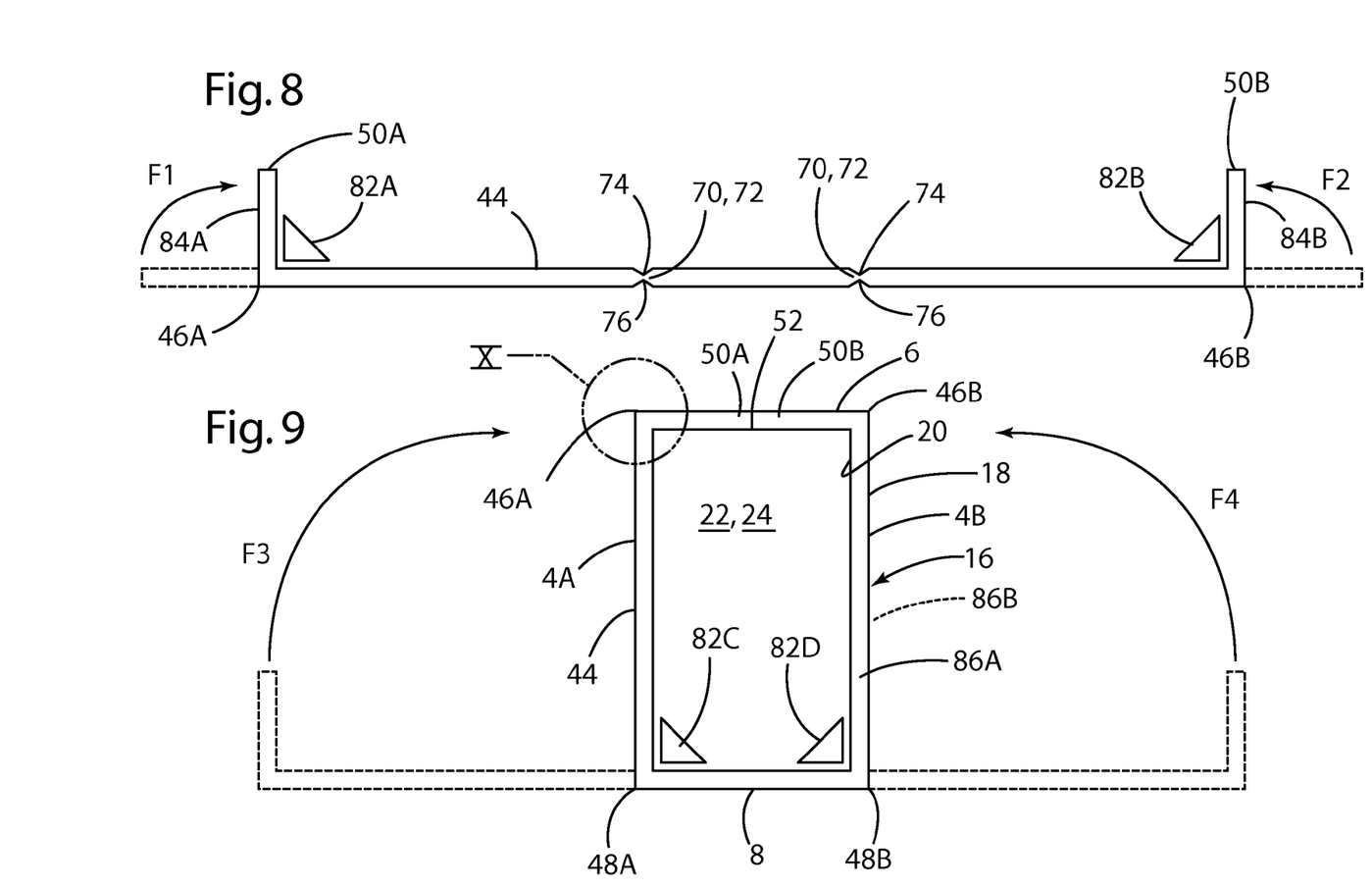
FIG. 8 is a partially schematic view showing the tube of FIG. 5 during the bending process.
FIG. 9 is a partially schematic view showing the tube of FIG. 5 during a second step of the bending process.

After formation of indentations 70 and/or 72 and grooves 74 and/or 76, the tube 44 is bent utilizing forming tools 82A-82D to form corners 46A, 46B, 48A and 48B as shown in FIGS. 8-9. The ends 50A and 50B are then joined together at seam 52. Seam 52 may comprise a welded joint or other suitable air-tight joint that is capable of maintaining a vacuum in the interior space 42 of the tubular primary structure 16. Prior to bending the tube as shown in FIGS. 8-9, the tube 44 may be filled with powdered silica such as fumed silica or other filler material. In general, the filler material 54 is inserted and compacted into the interior space 42 of tube 44 through one or both open ends 50A or 50B. Alternatively, as discussed below, the filler material 54 may be inserted into the interior space 42 utilizing valves/openings 56 and 58 (FIG. 2) after the tube 44 is deformed (FIGS. 8-9), and ends 50A and 50B are interconnected at seam 52.

With reference to FIG. 8, forming tools 82A and 82B are positioned along fold lines 68A and 68D, and a force is applied to the tube 44 adjacent to the end portions 50A and 50B to thereby fold the tube 44 as shown by the arrows "F1" and "F2". Folding of the tube 44 forms end portions 84A and 84B, and corners 46A and 46B, respectively. Sand or other temporary filler material may be positioned inside tube 44 at fold lines 68A and 68D to assist in the bending process.

With further reference to FIG. 9, forming tools 82C and 82D are then positioned adjacent the forming lines or location 68B and 68C (FIG. 5), and a force is applied to a tube 44 to thereby deform the tube as shown by the arrows "F3" and "F4". The ends 50A and 50B of tube 44 are then welded or otherwise secured together to form an air-tight seam 52.

As discussed above, the tubular primary structure 16 includes enlarged front and rear openings 22 and 24. The openings 22 and 24 generally define a rectangular perimeter 20, and the tubular primary structure 16 has a generally rectangular perimeter 18 in an elevational view (e.g. FIG. 9). The tubular primary structure 16 includes a generally rectangular "picture frame" front surface 86A and a rectangular rear surface 86B that is a mirror image of surface 86A. Referring again to FIG. 2, when assembled, the upright rear panel 28 is disposed adjacent or against rear surface 86A, and doors 10A and 10B are disposed against or adjacent surface 86A when the doors 10A and 10B are in the closed position.

Figure 10:
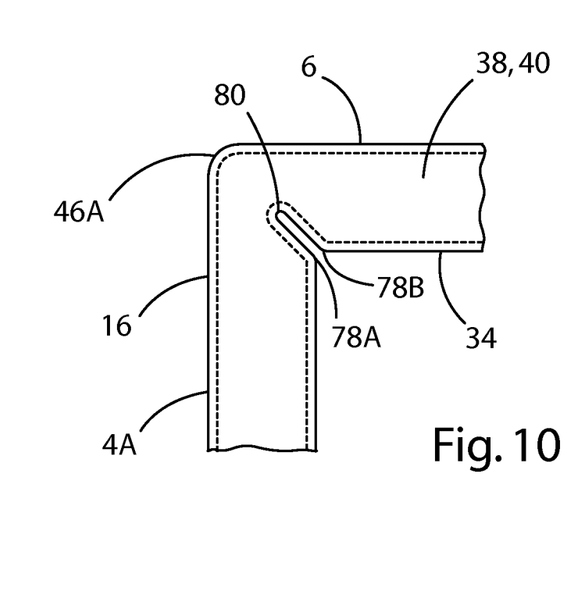
FIG. 10 is a partially fragmentary enlarged view of a portion of the tubular cabinet structure of FIG. 9.

With further reference to FIG. 10, after the tube 44 is deformed or folded to form corners 46A, 46B, 48A and 48B, the side walls of tube 44 generally deform as shown in FIG. 10 to form a crease 80 in inner wall 34 such that the surfaces 78A and 78B are directly adjacent one another, or in contact one another. In this way, the side walls 38 and 40 remain relatively flat in the region of the corners 46A, 46B, 38A and 38B. It will be understood that additional forming steps may be conducted in the vicinity of the corners to ensure that the outer surfaces of walls 38 and 40 are substantially planar.

Referring again to FIGS. 2 and 3, valves/openings 56 and 58 can be utilized to remove air from cavity 42 to form a vacuum. As discussed above, the filler material 54 may be inserted and compacted into the space 42 of tube 44 prior to formation of seam 52. Alternately, the tube 44 may be formed as shown in FIGS. 4-9, and the filler material 54 may then be inserted into space 42 utilizing valves/openings 56 and 58. If the filler material 54 is inserted into the space 42 prior to formation of seam 52, the primary structure 16 can be positioned in a vacuum chamber (not shown) after formation of seam 52, and one or both of the valves 56 and/or 58 can be opened to thereby form a vacuum in the inner space 42. The valves 56 and 58 can then be closed, and the tubular primary structure 16 can then be removed from the vacuum chamber. If the filler material 54 is inserted into the tube 44 prior to formation of seam 52, the filler material 54 is preferably compacted prior to the bending process shown in FIGS. 8 and 9. The filler material 54 may be inserted and compacted by closing off an end 50A (FIG. 5) of tube 44 utilizing a permeable barrier or filter (not shown) that permits airflow, but prevents flow of the filler material 54. The filler material 54 can then be blown into the open end 50B. Air can be circulated along the length of the tube 44 to thereby compact and distribute the filler material 54 throughout the interior space 42.

The filler material 54 may also be added after the tube 44 is bent into an O-shape (e.g. FIGS. 8 and 9) and after the seam 52 is formed. In this case, the valves or openings 56 and 58 can be utilized to fill the space 42 with the filler material 54. For example, a permeable barrier or filter may be positioned over opening 58, and filler material 54 may be blown into the space 42 utilizing valve or opening 56. As the filler material 54 is blown into the interior space 42, the airflow through the space 42 compacts the filler material. The tubular structure 16 may then be placed in a vacuum chamber, and the valves or openings 56 and/or 58 may be utilized to form a vacuum in the space 42 as discussed above. In general, the filler material 54 may comprise silica powder such as fumed silica or other porous material. The filler material 54 counteracts the inward forces acting on tube 44 due to the vacuum in space 42 and thereby prevents collapse or deformation of the side walls 34, 36, 38 and 40 of tubular structure 16.

The invention claimed is:

1. A method of fabricating a vacuum insulated refrigerator housing, the method comprising:
    forming an elongated tube having opposite open ends defining a length therebetween, the elongated tube having a substantially uniform cross sectional shape along the length of the tube, wherein the elongated tube defines generally planar first and second oppositely-facing primary outer surfaces and first and second end surfaces extending between the first and second primary outer surfaces;
    deforming the tube along at least four fold lines to form at least four corners whereby portions of the first primary surface adjacent each corner are substantially orthogonal relative to one another;
    connecting the opposite ends of the tube to one another forming an airtight and continuous insulating space within the tube to form a refrigerator housing structure having horizontally spaced apart generally vertical side walls and vertically spaced apart generally vertical upper and lower side walls, wherein the refrigerator housing structure defines an internal space with vertically enlarged front and rear openings;
    forming a vacuum in the insulating space within the tube;
    attaching an insulated rear panel to the refrigerator housing structure to at least partially close off the enlarged rear opening.

2. The method of claim 1, including:
    attaching at least one movable door to the refrigerator housing structure, whereby the movable door can be shifted between a closed position that restricts access to the internal space, and an open position permitting access to at least a portion of the internal space.

3. The method of claim 1, wherein:
    the tube is formed utilizing an extrusion process.

4. The method of claim 3, wherein:
    the tube comprises a metal material.

5. The method of claim 3, wherein:
    the tube comprises an impermeable polymer material.

6. The method of claim 5, wherein:
    the impermeable polymer material comprises first and second layers of polymer material that are formed by extruding.

7. The method of claim 6, wherein:
    the first layer comprises a substantially impermeable polymer material.

8. The method of claim 7, wherein:
    the first and second layers define substantially uniform first and second thicknesses, respectively, wherein the first thickness is much less than the second thickness.

9. The method of claim 1, wherein:
    the opposite ends of the tube are welded together to form a seam.

10. The method of claim 1, including:
    filling the insulating space with a porous filler material.

11. The method of claim 10, including:
    compacting the porous filler material prior to forming a vacuum in the insulating space.

12. The method of claim 11, wherein:
    the porous filler material comprises fumed silica powder.

13. The method of claim 1, wherein:

the tube is placed in a vacuum chamber prior to sealing the opposite ends of the tube.

14. The method of claim 1, including:

forming an indentation in at least one of the primary outer surfaces or the end surfaces at each of the fold lines prior to forming the four corners.

15. A method of forming a vacuum insulated refrigerator housing, the method comprising:

providing an elongated tube having opposite and open ends;

positioning the opposite ends of the tube adjacent one another by deforming the tube;

connecting the opposite ends together to form an airtight and continuous insulating space within the tube, and having spaced apart upright side walls and spaced apart upper and lower side walls extending between the upright side walls, wherein the refrigerator housing structure defines an internal space and enlarged front and rear openings, forming a vacuum in the airtight insulating space, and attaching an insulated rear panel to the refrigerator housing structure to at least partially close off the enlarged rear opening.

16. The method of claim 15, wherein:

forming the tube includes simultaneously extruding first and second polymer materials to form first and second layers.

17. The method of claim 16, wherein:

the first polymer material comprises EVOH.

18. The method of claim 15, including:

filling the tube with a porous filler material prior to forming a vacuum in the airtight insulating space.

19. The method of claim 15, including:

positioning the tube in a vacuum chamber prior to sealing off the opposite ends.

\* \* \* \* \*